United States Patent [19]

Pappas et al.

[11] 4,096,542
[45] Jun. 20, 1978

[54] CONTROLLER FOR VIDEO TAPE RECORDER

[75] Inventors: Frank Pappas; John L. Rennick, both of Elmwood Park, Ill.

[73] Assignee: Zenith Radio Corporation, Glenview, Ill.

[21] Appl. No.: 781,611

[22] Filed: Mar. 28, 1977

[51] Int. Cl.² .......................... H02H 3/12; H04N 7/00
[52] U.S. Cl. ..................... 361/196; 307/141; 325/396; 358/190
[58] Field of Search .......... 361/93, 196, 187; 307/141, 293; 328/129; 325/396, 492; 358/190, 296, 301; 360/69, 74, 81, 137; 346/107 A

[56] References Cited
U.S. PATENT DOCUMENTS

| | | | |
|---|---|---|---|
| 3,593,148 | 7/1971 | Cummings | 325/396 |
| 3,962,532 | 6/1976 | Aubert et al. | 360/69 X |

Primary Examiner—Patrick R. Salce
Attorney, Agent, or Firm—Cornelius J. O'Connor

[57] ABSTRACT

A controller for initiating operation of a video tape recorder and for terminating operation when its power consumption drops to a predetermined level utilizes a power transfer circuit for coupling the recorder to a source of energizing potential. A normally open switch, included in the transfer circuit, responds to an actuating signal developed by an operational amplifier, which amplifier is activated by an enabling signal from a preset clock. Thereafter, the amplifier is controlled by a derived signal having an amplitude proportional to the current drawn by the recorder. When the energizing current for the recorder drops below a predetermined level, the derived control signal is now of insufficient amplitude to maintain the amplifier in an operating condition, as a result, the actuating signal for switch is interrupted and operation of the recorder is terminated.

5 Claims, 1 Drawing Figure

U.S. Patent
June 20, 1978
4,096,542
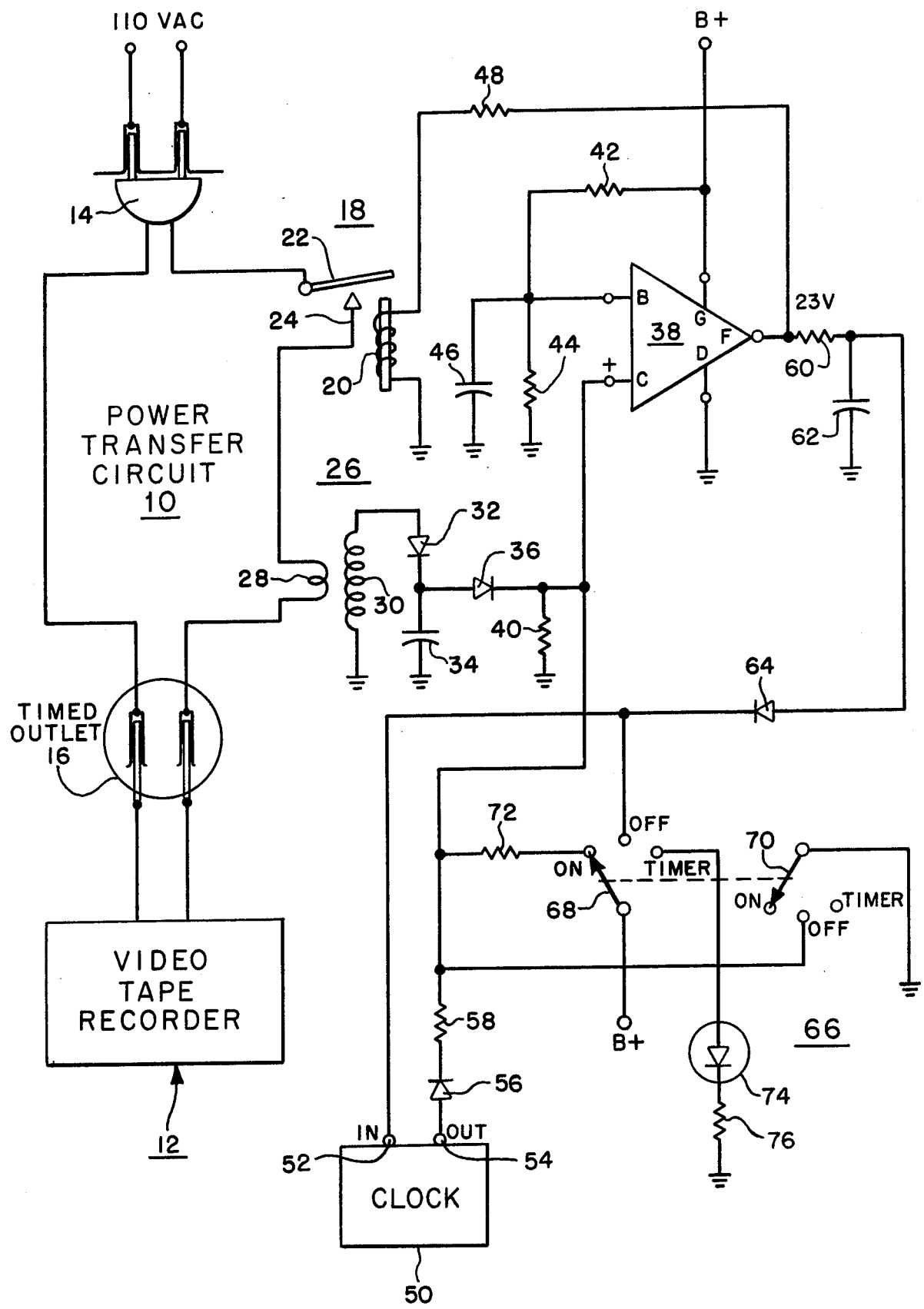

CONTROLLER FOR VIDEO TAPE RECORDER

BACKGROUND OF THE INVENTION

This invention relates, in general, to timers for electrically energized apparatus and, in particular, to a controller for initiating operation of a tape recorder at a preset time, and for terminating its operation in response to a reduction in power consumption by the recorder.

The use of a timer, in the form of a clock, in connection with home entertainment products is well known. For example, the conventional clock radio immediately suggests itself. The timing arrangement for clock radios, however, is usually one of two varieties, an arrangement which turns on the radio at a preset time and then permits the radio to play indefinitely, or an arrangement which turns on the radio at a preset time and thereafter turns it off, usually one, or more hours later. Insofar as clocks for radios are concerned, the industry has, of late, been particularly attracted to the digital type clock because of the accuracy with which it can be set. However, these digital clocks are commonly programmed for 1 hour of "ON" time.

It is also recognized that automatic timers are commonly used for switching lights on and off in a temporarily unoccupied home and, that such a device could be used to turn on a radio, a television receiver, or a tape recorder at a predetermined time and to turn the instrument off at a later time. In view of their design function, i.e., a time controlled light switch, the degree of accuracy afforded by such timers, insofar as turn on and turn off time is concerned, is nominal since it matters little exactly what time lights are turned on or off in the home.

As will be shown, the control of a video tape recorder occasions special timing considerations which, at best, can only be partially resolved by the aforementioned prior art timers. In this regard, while one prior art timer would turn the video recorder on and off, it would do so with questionable accuracy from a time standpoint; another timer may turn the recorder on with acceptable accuracy, but the recorder would be turned off one hour later, or it would remain energized until the preset hourly increments passed.

In the case of a video tape recorder, however, a presettable time is extremely critical for several reasons. First of all, if it is desired to record an upcoming television program via a preset timing arrangement, the turn on time must be extremely accurate if one is to be assured of recording the beginning of the program. On the other hand, the turn off time may not be so critical so long as the recorder remains energized until the tape is exhausted. This latter situation can be tolerated because any material stored subsequent to the conclusion of the deisred program can be readily erased.

As another example of prior art practice, timing control in a known video tape recorder has been resolved in the following manner. A built-in timer initiates the recording mode. However, the timer has a multiple hour "ON" period intentionally designed to accomodate the longest playing tapes available plus a substantial safety factor. In this particular recorder, there is also provided sensing circuitry which monitors the tape so that as the end of the tape approaches the drive capstan, a control signal is derived by a sensor which turns off the capstan drive motors. However, the signal processing and amplifier circuitry remain energized until the completion of the timer's multiple hour "ON" period. This, obviously, results in unnecessary operation of some of the recorder circuits as well as an undesirable waste of electrical energy.

Finally, it is appreciated that the circuitry of the recorder itself can be revised to adopt presettable timing circuitry of such sophistication as to resolve the problems posed herein. This, of course, is attractive insofar as to-be-manufactured units are concerned, but it is an impractical remedy for the multitude of recorders already in the field.

SUMMARY OF THE INVENTION

A controller for initiating operation of an electrically energized apparatus and for terminating operation of that apparatus, in response, to a reduction in its power consumption to a predetermined level, comprises a source of enabling signal, a power transfer circuit for coupling the apparatus to a source of energizing potential and a normally-open switch. The switch is included in the power transfer circuit and closes, in response to an actuating signal, to activate the power transfer circuit and thereby energize the apparatus. A current transformer has a primary winding included in the power transfer circuit and a secondary winding. Means are coupled to this secondary winding for developing a control signal having an amplitude proportional to the current drawn by the apparatus. Finally, a signal comparator is provided which has a first input circuit, coupled to the source of enabling signal and to the control signal developing means, and a fixed bias second input circuit. The comparator also has an output circuit which is coupled to the switch means for establishing a switch actuating signal upon receipt by said first input circuit of an enabling signal having an amplitude sufficient to overcome the fixed bias on the second input circuit. The output circuit maintains the actuating signal during application of the control signal but terminates the actuating signal when the control signal applied to the first input circuit drops below the value of fixed bias on the second input circuit.

BRIEF DESCRIPTION OF THE DRAWINGS

The features of the invention which are believed to be novel are set forth with particularity in the appended claims. The invention, together with further objects and advantages thereof, may best be understood with reference to the following description taken in conjunction with the accompanying drawing which depicts a schematic representation of a video tape recorder controller constructed in accordance with the invention.

OBJECTS OF THE INVENTION

It is therefore a general object of the invention to provide an improved controller for electrically energized apparatus.

It is a particular object of the invention to provide a controller for initiating operation of a tape recorder at a preset time and for terminating recorder operation in response to a reduction in its power consumption.

It is a further object of the invention to provide a controller-timer circuit for use with a video tape recorder which overcomes the limitations inherent in prior art electric timers.

DESCRIPTION OF THE PREFERRED EMBODIMENT

The controller disclosed in the drawing is intended to energize a video tape recorder at a preset time and to terminate operation of the recorder when its power consumption is reduced to a predetermined level. The objectives of the invention are achieved by resort to a power transfer circuit 10 which functions to couple and decouple a video tape recorder 12 to a source of energizing potential designated 110 Vac. As seen in the drawing, the power transfer circuit includes a conventional plug 14 for coupling the transfer circuit to the 110 Vac source as well as a receptacle 16 for accomodating the power cord of the tape recorder. A normally-opened switch means 18 can comprise a current actuated relay that includes a solenoid coil 20 actuatable by a signal comparator (described in detail below), a movable contact 22 and a fixed contact 24; the contacts being serially interposed in one lead of the power transfer circuit. A current transformer 26 comprises a winding 28, which is serially inserted in the same lead as the switch contacts, and a secondary winding 30.

A means is provided for developing a control signal having an amplitude proportional to the current drawn by the tape recorder, which means comprises a rectifier circuit that includes a diode 32 and a capacitor 34 serially connected across the secondary 30 of the current transformer. This diode capacitor circuit has a very rapid charging cycle in the order of milliseconds. The juncture of diode 32 and capacitor 32 is connected via a decoupling diode 36 to a non-inverting first input terminal C of a signal comparator 38 which preferably takes the form of an operational amplifier. A first input circuit for the amplifier includes this path. A resistor 40, which serves to return the cathode of diode 36 and amplifier input terminal C to reference potential, forms in association with capacitor 34, an RC time delay circuit having a discharge time constant of over 70 seconds.

A second input terminal of the operational amplifier comprises the inverting input terminal B which is connected via a resistor 42 to a source of unidirectional potential B+, preferably 24 Vdc, and, to reference potential by the parallel combination of the resistor 44 and a capacitor 46. In this fashion, resistors 42 and 44, in conjunction with B+, provide terminal B with a fixed bias and comprise a second input circuit for the amplifier. Terminal G of the operational amplifier is directly connected to B+ while terminal D is returned to reference potential. The output terminal F of the amplifier is connected through a first output circuit, comprising the resistor 48, to the upper terminus of solenois 20.

The controller further includes a source of enabling signal which can take the form of a presettable clock 50 having an input terminal 52 and an output terminal 54 from which the enabling signal issues. Terminal 54 is connected by a decoupling diode 56 and a resistor 58 to the first input circuit of the amplifier, that is, to terminal C. Desirably, resistor 58 is assigned the same value as resistor 40 so that the enabling signal issuing from the clock is divided down by a factor of two before application to input terminal C.

Operational amplifier 38 further comprises a second output circuit for deriving, at a time subsequent to the developing of a control signal by rectifier 32, a disabling signal. This second output circuit is comprised of a resistor 60 and a capacitor 62 which are serially connected between output terminal F of the amplifier and reference potential. When an output potential is developed at terminal F, in a manner to be detailed below, the disabling signal is derived at the juncture of resistor 60 and capacitor 62. The charging, as well as discharging, time constant of this RC circuit is approximately 2.2 seconds. Means comprising a conductive path, that includes a decoupling diode 64, are provided for applying the disabling signal to the clock input terminal 52.

Finally, the controller includes a manual switching arrangement 66 comprising a pair of interconnected switch arms 68, 70 which are conjointly displaceable between "ON," "OFF" and "TIMER" positions. As shown, with switch arm 68 in the "ON" position, it serves to connect a source of B+, 24 Vdc, to terminal C, through a voltage dropping resistor 72. Desirably, resistor 72 is assigned the same value as resistor 40 so that the B+ potential is divided down by a factor of two prior to application to terminal C. At the same time it is noted that switch arm 70, which is maintained at reference potential, occupies a neutral position.

Continuing, when both switch arms occupy the "OFF" position, arm 68 applies B+ to the input terminal 52 of the clock while arm 70 returns input terminal C of the amplifier to reference potential. Then, when both switch arms are advanced to the timer position, B+ is applied by arm 68 to a light emitting diode 74, which is returned to reference potential through a resistor 76, to indicate that the start time of the recorder is now dictated by clock 50. As shown, switch arm 70 again occupies a neutral position.

A video tape recorder with which the subject controller has been successfully employed was found to draw a peak-to-peak 60 cycle current of 2.25 amperes in the play-record mode but only 1.3 amperes in the standby mode. The operation of the subject controller, therefore, it will be discussed in connection with that recorder. Accordingly, with plug 14 connected to the 110 volt source and with the tape recorder connected to the timed outlet 16, switch 66 is turned to the "ON" position and a 24 volt energizing potential is then applied via voltage dividing resistors 72 and 40 to the first input circuit, terminal C, of operational amplifier 38. As a result of the voltage divider action, approximately 12 volts DC is applied to terminal C. Insofar as the second input circuit of the amplifier is concerned, the values of resistors 42 and 44 are selected to the end that a bias potential of approximately 4.4 volts is applied to amplifier input terminal B.

Prior to the application of an energizing potential to terminal C, the output terminal F of the amplifier is at approximately 0 volts because of the fixed bias of 4.4 volts applied to the inverting input terminal of the amplifier. This is the situation when switch 66 is in the "OFF" position since input terminal C of the amplifier is then maintained at reference potential. However, since terminal C is a non-inverting input terminal, the application thereto of a voltage exceeding the 4.4 volts fixed bias on terminal B causes the output voltage at amplifier terminal F to rise to approximately 24 volts. This voltage serves to energize solenoid 20 and effect a closing of the normally-open contacts 22, 24 in the power transfer circuit 10. With those contacts closed, a 110 Vac potential is now applied to outlet 16 and the tape recorder is energized.

With the tape recorder thus energized, alternating current is passed through primary 28 of the current transformer. This alternating current flow is converted to an alternating voltage which, by virtue of transformer action, causes an AC potential to be impressed across the series combination of rectifier 32 and capacitor 34. With the tape recorder fully energized and thus drawing 2.25 amperes, a control signal having an amplitude proportional to that current, is developed across resistor 40 for application to input terminal C of the amplifier. With the particular components herein given, a control signal of approximately 8 Vdc is developed. However, since the controller circuit is operating in the selected "ON" mode, the role of this control signal, insofar as the operational amplifier is concerned, is moot since the B+ potential applied through switch arm 68 overrides the control signal to maintain control of the amplifier.

Assume now that switch 66 is displaced to the "OFF" position. As indicated in the drawing, B+ potential is now applied by switch arm 68 to clock input terminal 52 to defeat the clock, all in a manner subsequently to be made clear, while switch arm 70 returns input terminal C to reference potential. With terminal C effectively at zero potential, and with the 4.4 volt bias still applied to terminal B, the output at terminal F of the amplifier is reduced to approximately zero so that solenoid 20 is de-energized permitting the contacts 22, 24 to resume their normally-open position thus opening the power transfer circuit to the tape recorder.

The operation of the video tape recorder and its controller through the agency of a timer will now be discussed. It will be assumed that presettable clock 50 has been set to turn on, i.e., issue an enabling signal, at 8:00 PM and that switch 66 is displaced so that arms 68, 70 occupy "TIMER" positions. Diode 74 is now illuminated to indicate that control of the recorder has been relegated to clock 50. Accordingly, at 8:00 PM, an enabling signal, approximating 24 Vdc, issues from output terminal 54 of the clock and is coupled via the voltage divider arrangement 58, 40 to input terminal C of the amplifier so that approximately 12 Vdc is applied thereto. Since this potential exceeds the fixed bias on input terminal B of the amplifier, the output voltage at terminal F rises to approximately 24 volts, which potential is applied across resistor 48 and solenoid 20. As a result contacts 22, 24 are closed and the recorder is energized through the power transfer circuit. Again, as previously explained, rectifier 32 and capacitor 34 serve to develop a 8 Vdc control signal across resistor 40 which is applied to amplifier terminal C.

Meanwhile, the 24 volt potential at terminal F is simultaneously applied to the second output circuit of the amplifier, that is to resistor 60 and capacitor 62, to derive a disabling signal. As previously noted, this disabling signal is applied via diode 64 to the input terminal 52 of the clock. Upon receipt of the disabling signal, the enabling signal issuing from clock terminal 54 is defeated, that is, terminated. This is a characteristic of the particular clock employed so that, absent any other provision, receipt of a disabling signal at clock terminal 52 renders the operational amplifier nonconductive.

However, in order to prevent this disabling signal from effectively turning off amplifier 38, the charging time constant of the circuit comprising resistor 60 and capacitor 62 is arranged to be much longer than the charging time constant of the control signal source, that is rectifier 32 and capacitor 34. In other words, to insure that the amplifier remains conductive, it is imperative that the enabling signal from clock terminal 54 remain applied to amplifier terminal C until the control signal developed across resistor 40 reaches a potential in excess of the 4.4 volt fixed bias on terminal B. Therefore, only after a sufficient time has passed to permit development of an 8 volt control signal for input terminal C, may the disabling signal be applied to the clock to defeat the enabling signal from terminal 54.

With clock 50 now effectively removed as a control element, the tape recorder will remain energized and operating until internal sensing circuitry, which monitors the tape, determines that the end of the tape is approaching the drive capstan. A internal signal is then generated by the tape recorder to effect a shut-off of the capstan drive motors. However, as previously noted, signal processing and amplifier circuitry in the recorder remain energized and would remain so except for the subject controller arrangement. More particularly, as the recorder tape drive motors are de-energized, the energizing current drawn by the recorder drops to approximately 1.3 amperes. The alternating voltage now induced across secondary 30 is such that the rectifier 32 and capacitor 34 now develops a control signal across resistor 40 that does not exceed approximately 3.5 volts. Since this control voltage is significantly less than the 4.4 volts fixed bias on terminal B of the amplifier, the output of the operational amplifier drops to zero, solenoid 20 is de-energized and the power transfer circuit is open circuited to terminate, completely, operation of all tape recorder circuitry. At the same time the signal derived at the junction of resistor 60 and capacitor 62 discharges to 0 so that a disabling potential is no longer applied to clock input terminal 52. As a result, the clock is conditioned to issue at enabling signal at 8:00 PM the following day.

If it is assumed that the tape recorder apparatus is unattached the following evening and switch 66 had been left in the "TIMER" position, the following sequence of events will ensue. At 8:00 PM the enabling signal from clock terminal 54 will be applied to the operational amplifier input terminal C producing a current flow in the first output circuit associated with terminal F to effect a closure of switch contacts 22 and 24 and energization of the recorder. Simultaneously, a disabling signal is derived by the RC circuit 60, 62 and fed back to clock terminal 52. However, the energizing current drawn by the recorder will not exceed 1.3 amps since, on the previous evening, the end-of-tape sensing circuit had open-circuited the capstan drive motors. Since the control signal developed across resistor 40 under this condition will not exceed 3.5 volts, that control signal will be insufficient to overcome the fixed 4.4 volt bias on input terminal D. Meanwhile, the disabling signal derived in the second output terminal of the amplifier has risen to a value sufficient to defeat the enabling signal issuing from clock terminal 54. Thus, as has been shown, while the clock will initiate operation of the controller circuit and the video recorder, the end-of-tape condition of the recorder will insure that the amplitude of the control signal developed by the rectifier circuit will be insufficient to take over for the enabling signal to maintain operation of the amplifier. Thus, upon any subsequent energization of the controller by the clock under the above described condition, closure of the power transfer circuit will be momentary, that is, for a period determined by the time constant of the RC circuit 60, 62.

To enable others to readily practice the invention, a table of the actual values for the circuit elements, as well as identification of the clock and operational amplifier are given below. While these components have been proved in an actual operation of the invention they are intended only as typical values, other circuit variations will no doubt be suggested to those skilled in the art. For example, insofar as the operational amplifier 38 is concerned, it can be replaced by any of a variety of differential amplifiers.

| | |
|---|---|
| Clock 50 | Monolithic digital alarm Clock circuit EA 5316, Electronic Arrays, Inc., Mountain View, California |
| Operational Amplifier 38 | Monolithic silicon integrated circuit MC1741C, Motorola, Inc. |
| Switch 18 | Zenith Part No. 194-45-01 |
| Transformer 26 | Primary 28, 5 turns #18 wire Secondary 30, 500 turns #30 wire Core ⅝ × ⅝ EI; Lamination, 24 Ga M22AAS |
| Diode 32 | IN819 |
| Capacitor 34 | 470 pf |
| Diode 36 | IN819 |
| Resistor 40 | 150 K |
| Resistor 42 | 18 K |
| Resistor 44 | 4.7 K |
| Capacitor 46 | 10 pf |
| Resistor 48 | 680 |
| Diode 56 | IN819 |
| Resistor 58 | 150 K |
| Resistor 60 | 4.7 K |
| Capacitor 62 | 470 pf |
| Diode 64 | IN819 |
| Resistor 72 | 150 K |
| LED 74 | MV50 (Monsanto) |
| Resistor 76 | 3.9 K |

In summary, the invention provides a controller arrangement for use with a video tape recorder which resorts to circuitry for developing a control signal indicative of the energizing current drawn by the recorder and utilizes that control signal, in conjunction with a signal comparator, to terminate operation of the recorder when the energizing current of the recorder is reduced to a predetermined level.

While a particular embodiment of the invention has been shown and described, it is apparent that changes and modifications may be made therein without departing from the invention in its broader aspect. The aim in the appended claims, therefore, is to cover all such changes and modifications as fall within the truespirit and scope of the invention.

WHAT IS CLAIMED IS:

1. A controller for initiating operation of an electrically energized apparatus and for terminating operation of that apparatus, in response to a reduction in its power consumption to a predetermined level, said controller comprising:
   a source of enabling signal;
   a power transfer circuit for coupling said apparatus to a source of energizing potential;
   normally-open switch means included in said power transfer circuit and responsive to an actuating signal for closing said switch to activate said power transfer circuit and thereby energize said apparatus;
   a current transformer comprising a primary winding included in said power transfer circuit and a secondary winding;
   means coupled to said secondary winding for developing a control signal having an amplitude proportional to the current drawn by said apparatus;
   a signal comparator having a first input circuit coupled to said source of enabling signal and to said control signal developing means, and also having a fixed bias second input circuit,
   said comparator further having an output circuit, coupled to said switch means, for establishing a switch actuating signal upon receipt by said first input circuit of an enabling signal having an amplitude sufficient to overcome the fixed bias on said second input circuit, for maintaining said actuating signal during application of said control signal to said first input circuit and for terminating said actuating signal when said control signal drops below the value of fixed bias on said second input circuit.

2. A controller in accordance with claim 1 which further includes means, coupled to said control signal developing means, for delaying for a predetermined period of time upon occurrence of said reduction of power consumption, the decay of said control signal to a level below the bias on said second input circuit.

3. A controller in accordance with claim 1 in which said signal comparator comprises an operational amplifier.

4. A controller in accordance with claim 1 in which said means for developing said control signal comprises a rectifier circuit.

5. A controller for initiating operation of an electrically energized apparatus at a preset time and for terminating operation of that apparatus in response to a reduction in its power consumption to a predetermined level, said controller comprising:
   a presettable clock comprising means for developing at a preset time, an enabling signal, said means including an input terminal and an output terminal;
   a power transfer circuit for coupling said apparatus to a source of energizing potential;
   a normally-open switch means included in said power transfer circuit and responsive to an actuating signal for closing said switch to activate said power transfer circuit and thereby energize said apparatus;
   a current transformer comprising a primary winding included in said power transfer circuit and a secondary winding;
   means coupled to said secondary winding for developing a control signal having an amplitude proportional to the current drawn by said apparatus;
   a signal comparator comprising a first input circuit coupled to said clock output terminal and to said control signal developing means,
   a fixed bias second input circuit,
   a first output circuit, coupled to said switch means, for establishing a switch actuating signal upon receipt, by said first input circuit, of an enabling signal having an amplitude that exceeds the bias on said second input circuit, for maintaining said actuating signal during application of said control signal to said first input circuit and for terminating said actuating signal when said control signal drops below the value of fixed bias on said second input circuit,
   said signal comparator further comprising a second output circuit for deriving, subsequent in time to the developing of said control signal, a disabling signal; and
   means for coupling said disabling signal to said clock input terminal to defeat said enabling signal.

* * * * *